(12) United States Patent
Hammons

(10) Patent No.: US 6,234,510 B1
(45) Date of Patent: May 22, 2001

(54) TRAILER HITCH GUIDE

(75) Inventor: Johnny M. Hammons, Mendenhall, MS (US)

(73) Assignee: Victoria Varley, Santa Fe, NM (US)

( * ) Notice: Subject to any disclaimer, the term of this patent is extended or adjusted under 35 U.S.C. 154(b) by 0 days.

(21) Appl. No.: 09/501,980

(22) Filed: Feb. 11, 2000

(51) Int. Cl.$^7$ ...................................................... B60D 1/02
(52) U.S. Cl. ............................................ 280/477; 280/511
(58) Field of Search .................................. 280/477, 495, 280/504, 508, 511

(56) References Cited

U.S. PATENT DOCUMENTS

| | | |
|---|---|---|
| 3,765,703 * 10/1973 | Voelkerding et al. | 280/477 |
| 3,879,062 4/1975 | Miller . | |
| 4,226,438 10/1980 | Collins . | |
| 4,840,392 6/1989 | Baskett . | |
| 4,844,496 * 7/1989 | Webb et al. | 280/477 |
| 4,871,184 10/1989 | Johnson . | |
| 5,236,215 * 8/1993 | Wylie | 280/477 |
| 5,330,196 7/1994 | Ricles . | |
| 5,465,992 * 11/1995 | Anderson | 280/477 |
| 5,503,422 * 4/1996 | Austin | 280/477 |
| 5,529,330 * 6/1996 | Roman | 280/477 |
| 5,549,316 * 8/1996 | Jones | 280/477 |
| 5,697,630 12/1997 | Thompson et al. . | |
| 5,725,232 3/1998 | Fleming . | |
| 5,779,256 7/1998 | Vass . | |
| 5,797,616 * 8/1998 | Clement | 280/477 |

FOREIGN PATENT DOCUMENTS

963504 * 2/1975 (CA) .................................... 280/477

\* cited by examiner

*Primary Examiner*—Daniel G. DePumpo
(74) *Attorney, Agent, or Firm*—Peacock, Myers & Adams

(57) ABSTRACT

The trailer hitch guide includes a V-shaped fence removably attached to a base plate, the base plate being attached to a tow bar by a ball hitch. The V-shaped fence formed by a pair of plates defining a dihedral angle. The fence is temporarily and removably attached to the base plate by a pair of studs extending from the bottom edges of the fence plates. The base plate has a pair of elongated cylindrical tubes which define sockets into which the fence studs may be inserted. In a first embodiment, the base plate has a U-shaped member attached to the sides of the base plate with the crossbar in a plane vertically below the base plate, defining a rectangular collar in conjunction with the base plate having a perimeter slightly larger than the tow bar so that the collar slides over and encircles the tow bar. The elongated cylindrical tubes are attached to the sides of the U-shaped member. The collar prevents the guide from yawing around the base plate or rocking forwards and backwards as the socket on the trailer tongue pushes against the fence. In a second embodiment, the base plate is a flat plate having a notch defined in its back edge adapted for receiving the trailer hitch, the two elongated tubes depending from the bottom surface of the base plate. The fence is removed from the base plate after connection of the trailer hitch to allow unrestricted rotation of the hitch.

4 Claims, 8 Drawing Sheets

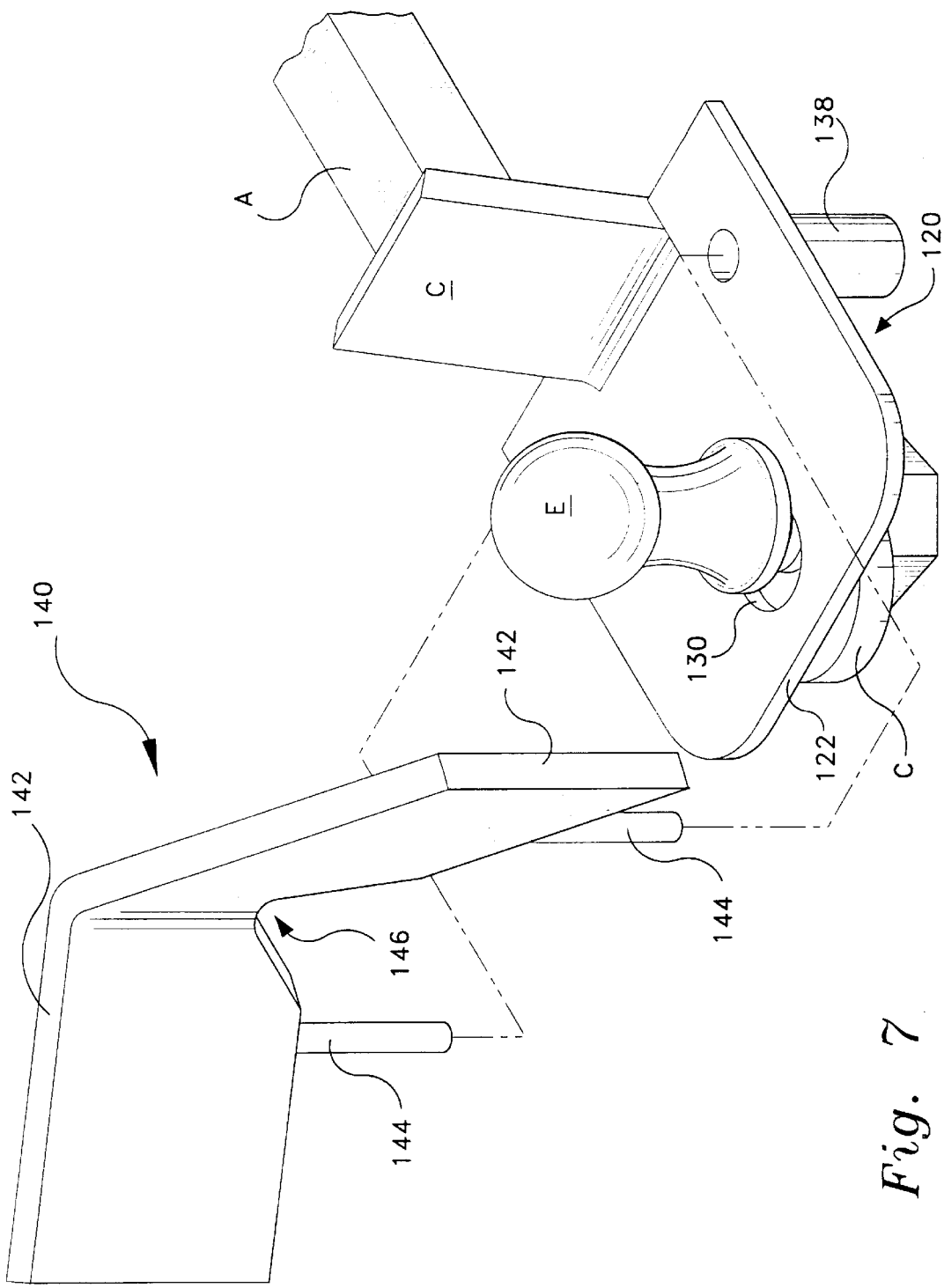

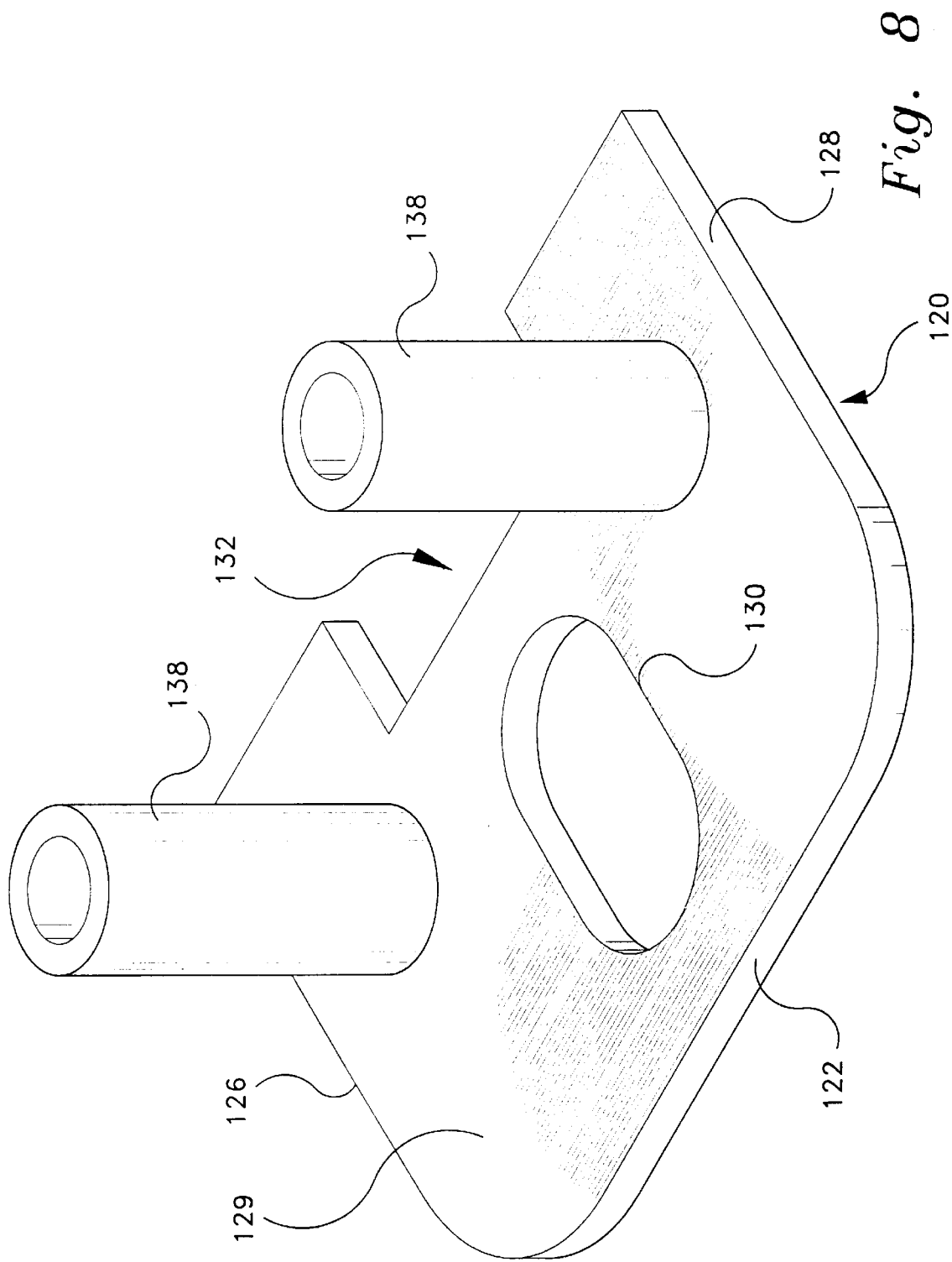

//TRAILER HITCH GUIDE

BACKGROUND OF THE INVENTION

1. Field of the Invention

The present invention relates to trailer hitches, and particularly to a trailer hitch guide for guiding the tongue of a trailer over the trailer hitch in order to connect a ball and socket trailer hitch.

2. Description of Related Art

Trailer hitches commonly use a socket of the trailer tongue which mates with a ball on a tow bar attached to the towing vehicle to connect the trailer to the towing vehicle. The procedure usually involves jacking the trailer tongue so that the socket is above the horizontal plane of the ball and backing up the towed vehicle in order to align the ball to a position vertically under the socket, and lowering the socket to engage the ball. One of the problems frequently encountered is that the tow bar and the trailer tongue are not visible to the driver of the towed vehicle during the connection process. Consequently, it may take several attempts to properly align the ball and socket, requiring the operator of the towing vehicle to get out of the vehicle and walk to the rear each time and estimate the correction required to obtain the proper angle and distance.

A variety of trailer hitch guides have been proposed to make this process quicker and easier. U.S. Pat. No. 3,879,062, issued Apr. 22, 1975 to D.C. Miller describes a V-shaped towing guide attached to the hitch by vertical arms having a transverse mounted bolt and flexible chain partially wrapped around a support strut. The forces applied to the V-shaped guide are transferred to the towing vehicle by a transverse bar leaning against the license plate of the towing vehicle, or by a rope and vertical arms leaning against the bumper.

U.S. Pat. No. 4,226,438, issued Oct. 7, 1980 to W. L. Collins, shows a one-piece guide including a V-shaped guide at right angles to a plate having a hole so that the plate may be attached to a flat bumper or hitch bar by passing a mounting stud at the base of the ball through the hole in the plate. U.S. Pat. No. 4,871,184, issued Oct. 3, 1989 to R. C. Johnson, teaches a guide assembly with a base plate having a horizontal bottom plate and two vertical angled side walls, the bottom plate having a channel for receiving or sliding onto the base of a ball hitch. The guide also includes a stop plate with a back plate and 2 angled side walls which slide into a slot formed by the base plate, being secured by two inverted U-shaped flanges or brackets on the top edges of the side walls.

U.S. Pat. No. 4,840,392, issued Jun. 20, 1989 to T. N. Baskett, shows a V-shaped fence that attaches to a plate secured to the hitch by the ball, the fence being mounted to the plate by downwardly and rearwardly directed studs which removably fit openings in the plate. The plate includes projections that engage opposite sides of the hitch tube to add lateral stability to the plate. U.S. Pat. No. 5,330,196, issued Jul. 19, 1994 to R. Ricles, teaches a V-shaped guide having a central panel and 2 side panels extending farther down than the central panel in order to define a groove having the same width as the trailer hitch bar, the guide sliding between two vertical panels mounted on the hitch bar, the rear vertical panel being supported by a triangular wedge.

U.S. Pat. No. 5,697,630, issued Dec. 16, 1997 to Thompson, et al., describes a base plate attached to the tow bar by the ball hitch, the base plate having two vertical struts extending backwards and upwards from opposite sides of the base plate, and a socket extending between the struts. A guide plate with two angles plates and a center mounting portion mount in the socket by means of a tongue on the bottom of the center mounting portion. U.S. Pat. No. 5,725,232, issued Mar. 10, 1998 to T. R. Fleming, teaches a base plate with a channel member extending transversely mounted to the underside of the tow bar by a ball hitch. A V-shaped guide with a central alignment plate has flanges depending from the V-guide side panels, a key being inserted through the flanges and channel to secure the guide to the tow bar. The side panels have resilient urethane pads to protect the guide from the impact of the trailer tongue.

U.S. Pat. No. 5,779,256, issued Jul. 14, 1998 to T. V. Vass, shows a V-shaped plate having tubes on the side of the vertical side plates, a pin secured by a thumb screw extending through each side tube, the pin having another side tube welded at the bottom of the pin, the side tube receiving another pin secured by a thumb screw and welded at the end to another pin extending through reinforced holes in a mounting plate.

None of the above inventions and patents, taken either singly or in combination, is seen to describe the instant invention as claimed.

SUMMARY OF THE INVENTION

The trailer hitch guide includes a V-shaped fence removably attached to a base plate, the base plate being attached to a tow bar by means of a ball hitch. The V-shaped fence formed by a pair of plates defining a dihedral angle. The fence is temporarily and removably attached to the base plate by means of a pair of studs extending from the bottom edges of the fence plates. The base plate has a pair of elongated cylindrical tubes which define sockets into which the fence studs may be inserted. In a first embodiment, the base plate has a U-shaped member attached to the sides of the base plate with the crossbar in a plane vertically below the base plate, defining a rectangular collar in conjunction with the base plate having a perimeter slightly larger than the tow bar so that the collar slides over and encircles the tow bar. The elongated cylindrical tubes are attached to the sides of the U-shaped member. The collar prevents the guide from yawing around the base plate or rocking forwards and backwards as the socket on the trailer tongue pushes against the fence. In a second embodiment, the base plate is a flat plate having a notch defined in its back edge adapted for receiving the trailer hitch, the two elongated tubes depending from the bottom surface of the base plate. The fence is removed from the base plate after connection of the trailer hitch to allow unrestricted rotation of the hitch.

Accordingly, it is a principal object of the invention to provide a trailer hitch guide for a ball and socket trailer hitch with a removable fence in order to permit the trailer tongue to freely rotate about the hitch ball after use of the guide.

It is another object of the invention to provide a quick and secure method for attaching the guide fence of a trailer hitch guide to the base plate in the form of studs extending from the bottom edges of the guide fence plates, the studs slidably engaging elongated cylindrical tubes attached to the base plate.

It is a further object of the invention to provide a trailer hitch guide which is of simple construction, providing low cost and ease in manufacturing.

Yet another object of the invention is to provide a trailer hitch guide in which the guide base plate is prevented from yawing about the trailer hitch either by a collar disposed about the hitch, or by a notch defined in the base plate which received the hitch.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 7 shows an exploded, environmental perspective view of a second embodiment of the trailer hitch guide according to the present invention.

FIG. 8 shows a bottom perspective view of the base plate of a second embodiment of the trailer hitch guide according to the present invention.

Similar reference characters denote corresponding features consistently throughout the attached drawings.

DETAILED DESCRIPTION OF THE PREFERRED EMBODIMENTS

Figure 1:
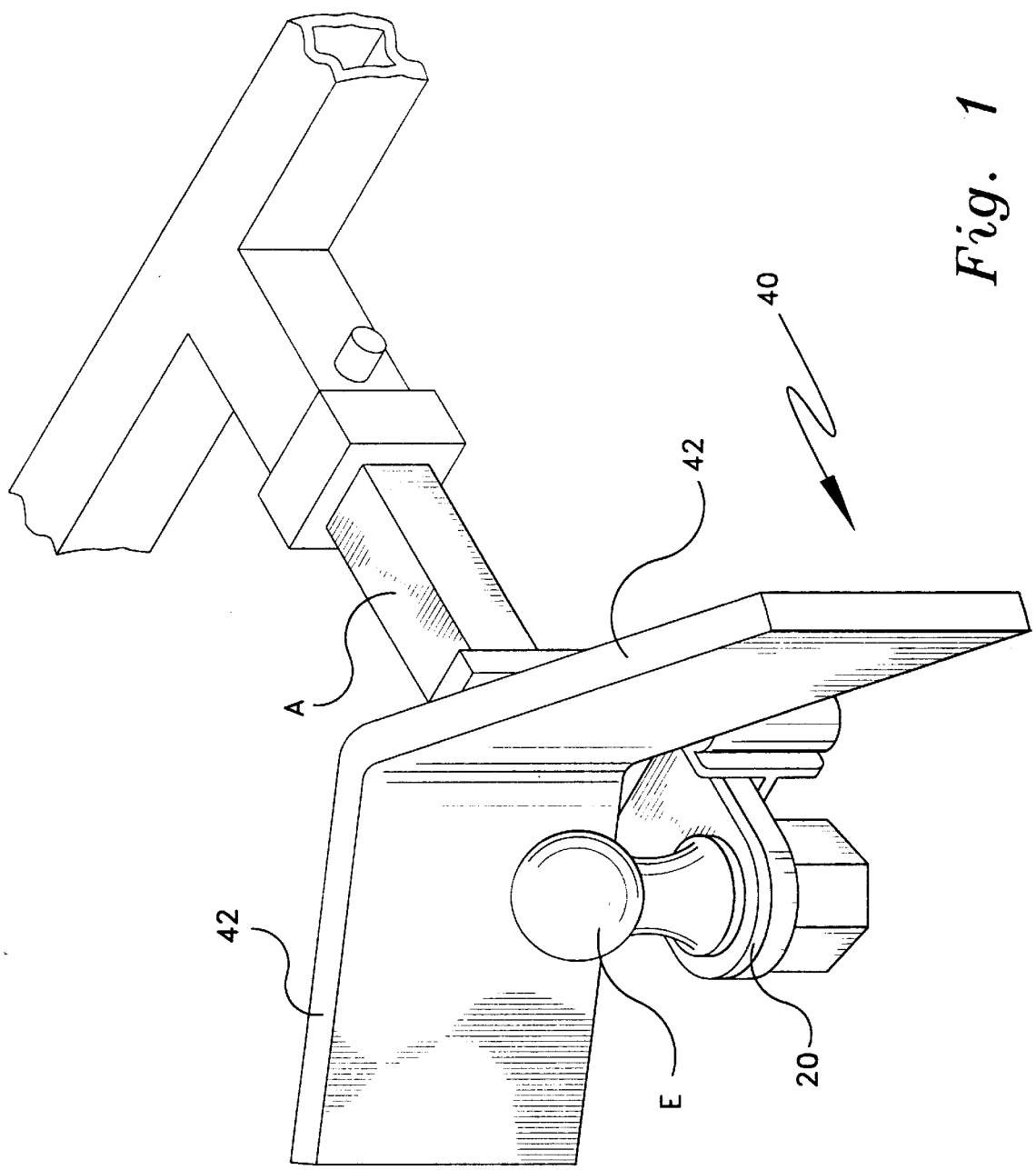
FIG. 1 is an environmental perspective view of a trailer hitch guide according to the present invention.
Figure 2:
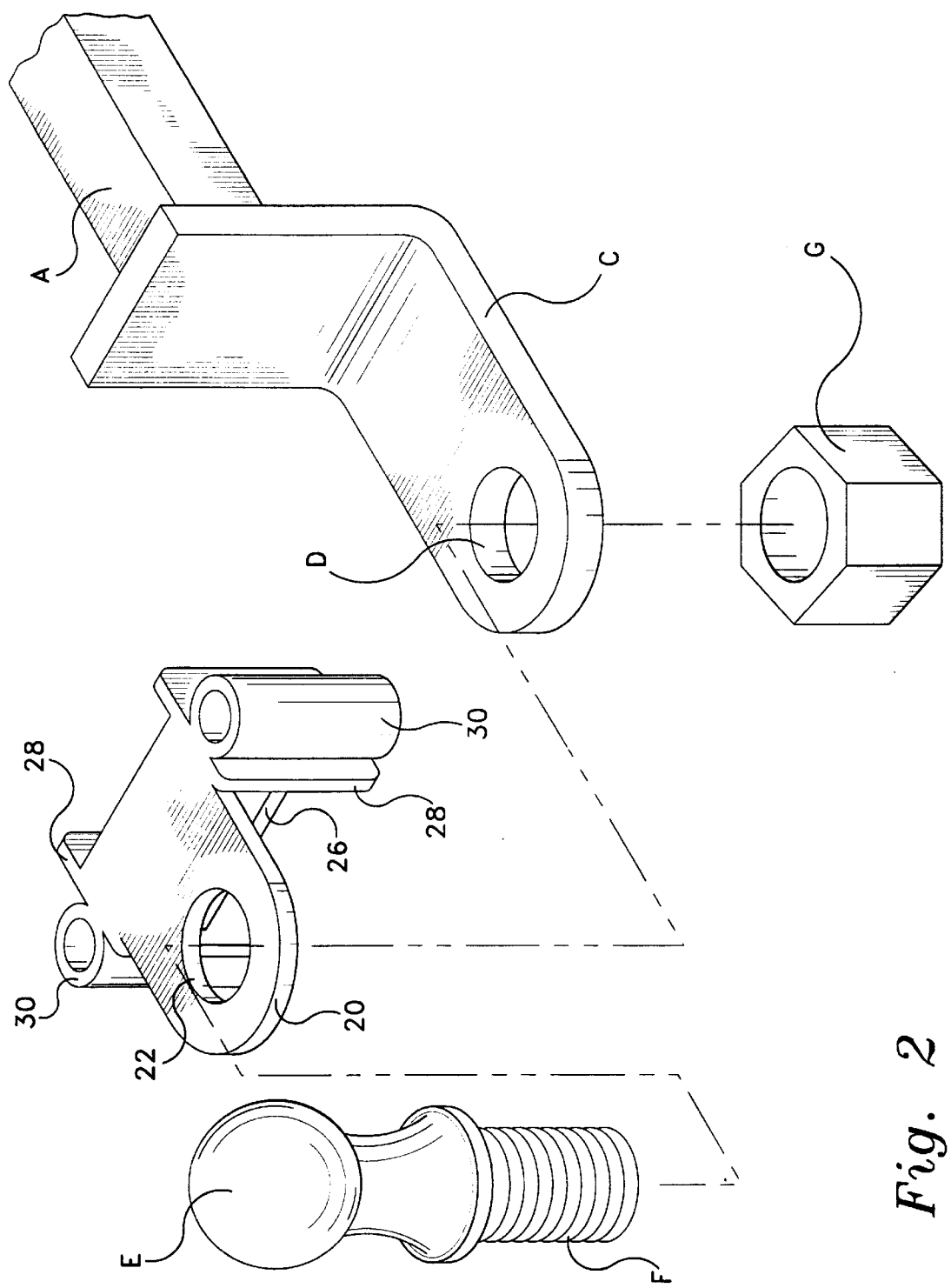
FIG. 2 is an environmental perspective view showing the base plate of the trailer hitch guide according to the present invention.

The present invention is a trailer hitch guide. A first embodiment of the trailer hitch guide is shown in Figs, 1 through 5. As shown in FIG. 1, the trailer hitch guide includes a base plate 20 and a fence 40. The trailer hitch includes a box beam A attached to the rear end of the towing vehicle (not shown). At its free end the box beam A has an angle C with one leg of the angle C projecting rearward and having a hole D defined therein. The hole D is adapted to receive a stud F depending from a spherical ball hitch E. The hole D may be threaded, or the stud F may pass entirely through the hole D in order to be secured by a nut G, as shown in FIG. 2. The ball hitch E is adapted to receive a mating socket on the trailer tongue (not shown) in order to connect the trailer to the towing vehicle. As shown in FIGS. 2, the base plate 20 has a hole 22 defined therein so that the base plate 20 may be attached to the angle C of the trailer hitch by sandwiching the base plate 20 between the base or platform of the spherical ball hitch E and the rearwardly projecting leg of the angle C, the stud F being inserted through the aligned holes D and 22 and secured by nut G.

Figure 3:
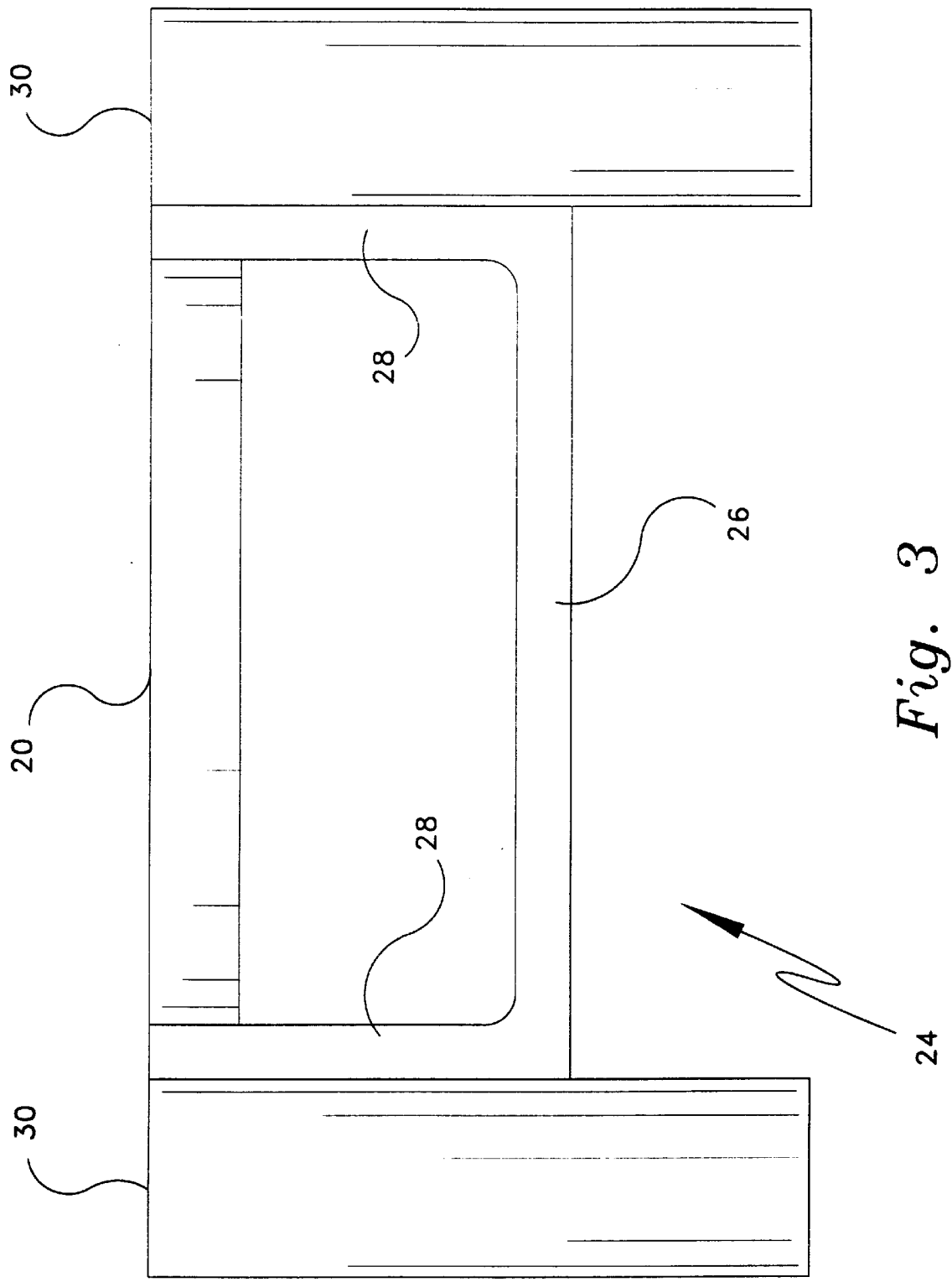
FIG. 3 shows a front view of the base plate of the trailer hitch guide according to the present invention.

As shown in FIGS. 2 and 3, the base plate 20 has a U-shaped member 24 attached to its sides, as by welding, the crossbar 26 of the U-shaped member being in a plane vertically below the base plate 20 so that the base plate 20 and U-shaped member 24 define a rectangular collar. The inside perimeter of the collar is slightly larger than the outside perimeter of the rearwardly projecting leg of the angle C, the height of the rectangle being slightly larger than the thickness of the leg and the width of the rectangle being slightly larger than the width of the leg of the angle C, so that the collar slides onto the trailer hitch.

Figure 4:
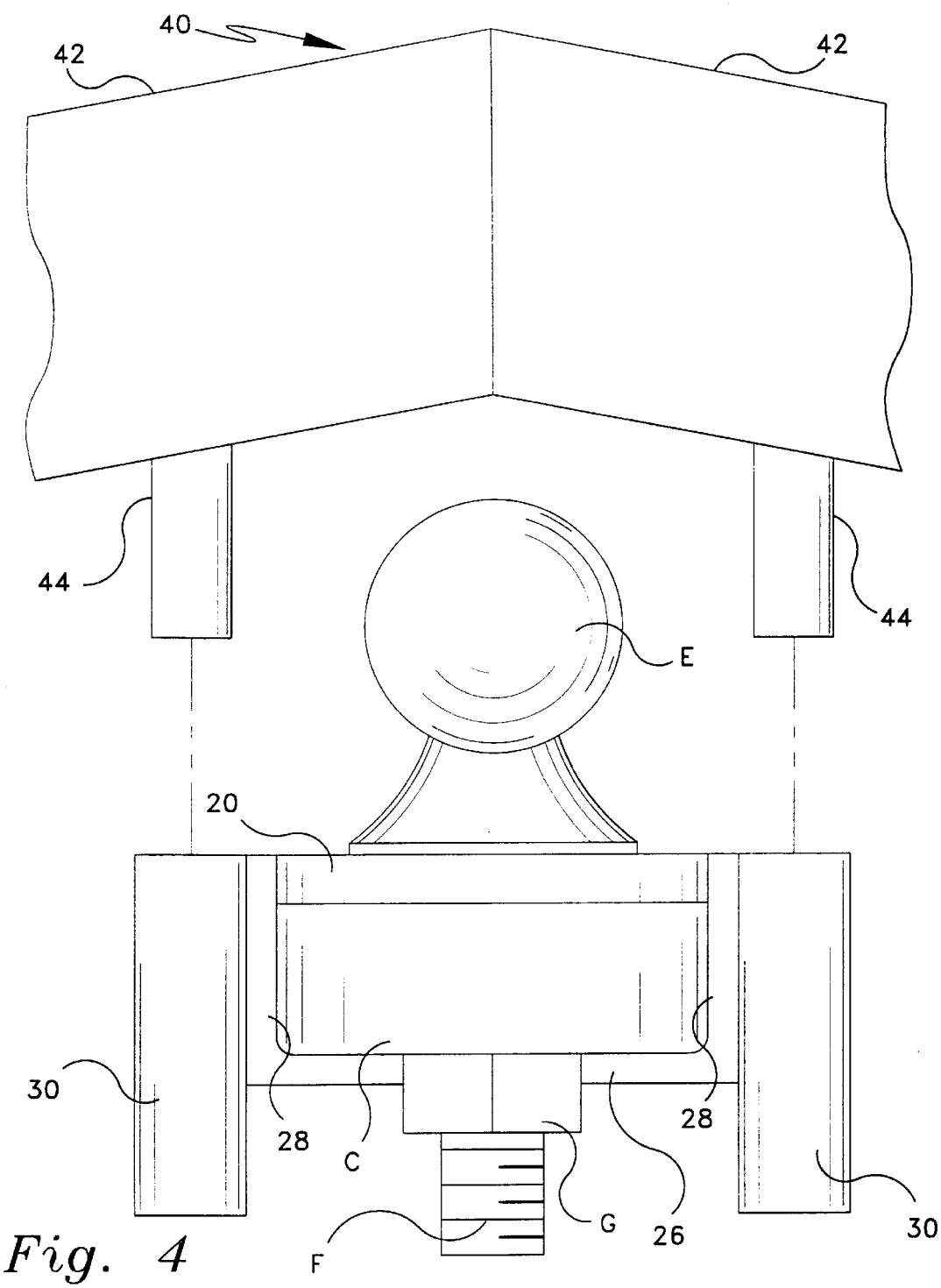
FIG. 4 shows an environmental front view of the trailer hitch guide according to the present invention.
Figure 5:
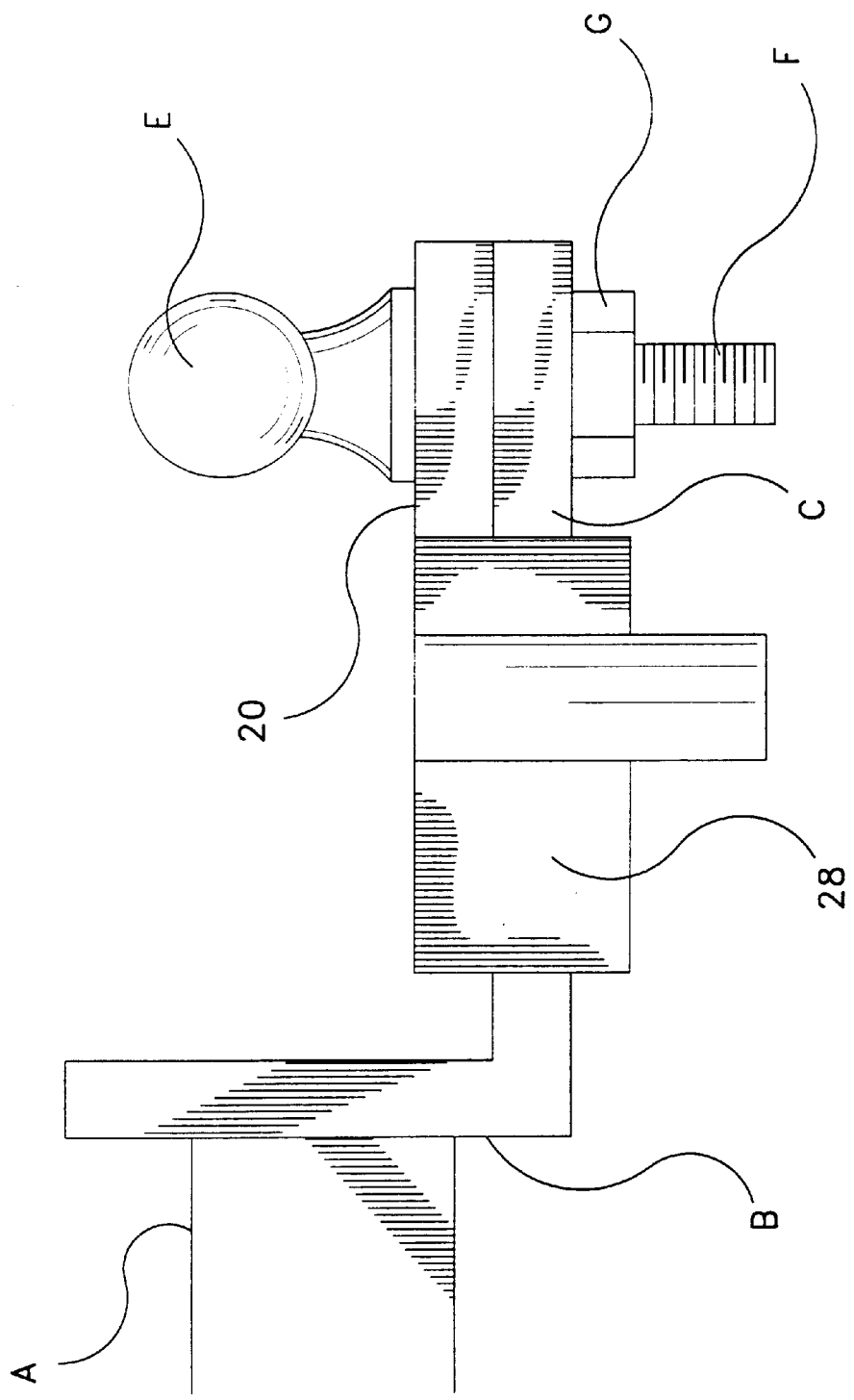
FIG. 5 shows an environmental side view of the trailer hitch guide according to the present invention.

The side plates 28 of the U-shaped member 24 may be wider than the width of the crossbar 26. As shown in FIGS. 4 and 5, the side plates 28 grasp the sides of horizontal leg of the angle C in order to prevent rotation or yawing of the base plate 20 when the trailer tongue pushes against the fence 40. The crossbar, on the other hand, helps to prevent the base plate 20 from rocking forward and backward when the trailer pushes against the trailer tongue. Hence the U-shaped member adds stability to the structure of the trailer hitch guide.

An elongated, hollow, cylindrical tube 30 is attached to each side plate 28 of the U-shaped member 24, as by welding. The top rim of each tube 30 is substantially coplanar with the top surface of the base plate 20 and the top edge of the side plates 28 of the U-shaped member 24. Consequently, with the fence 40 removed from the base plate 20, the trailer tongue is able to rotate on the ball hitch E unrestricted by the trailer hitch guide.

As shown in FIGS. 1 and 4, the guide includes a V-shaped fence 40 formed from two plates 42 joined, as by welding, at a line in order to form a dihedral angle. Each plate 42 has a stud 44 or pin depending from its bottom edge and fixedly attached thereto, as by welding. As shown in FIG. 4, fence 40 is attached to the base plate 20 by inserting the studs 44 into the cylindrical tubes 30. The height of the cylindrical tubes 30 is elongated so that the entire length of the studs 44 may be inserted into the tubes 30. The walls of the tubes 30 are thick enough and strong enough to withstand any forces exerted on the walls by the studs 44 as a result of the trailer tongue pressing against the fence 40.

In use, the base plate 20 is mounted on the tow bar of the towing vehicle by sliding the rectangular collar formed by the base plate 20 and U-shaped member 24 onto the tow bar and securing the base plate 20 to the tow bar with the ball hitch stud F and retaining nut G. The fence 40 is attached to the base plate 20 by slidably inserting the studs 44 into the cylindrical tubes 30 so that the vertex of the V-shaped fence 40 points towards the front of the towing vehicle and the open mouth of the V-shape is directed rearward, the ball hitch E being disposed between the plates 42 adjacent the vertex of the dihedral angle. The trailer is jacked up so that the trailer tongue is in a plane above the ball hitch E, and the towing vehicle is backed towards the trailer. As the fence 40 strikes against the trailer tongue, the tongue is funneled towards the vertex of the dihedral angle formed by the plates 42 and thereby centered over the ball hitch E. The sides 28 of the U-shaped member 24 prevent the fence 40 from yawing and the cross bar 26 prevents the fence 40 from rocking forward and backward as the tongue is being centered. The jack then lowers the trailer tongue so that the socket engages the ball hitch E. After the connection is secured, the fence 40 is slidably removed from the base plate 20, permitting the trailer tongue to freely rotate on the hitch. The base plate 20 may be left permanently mounted on the tow bar, if desired.

Figure 6:
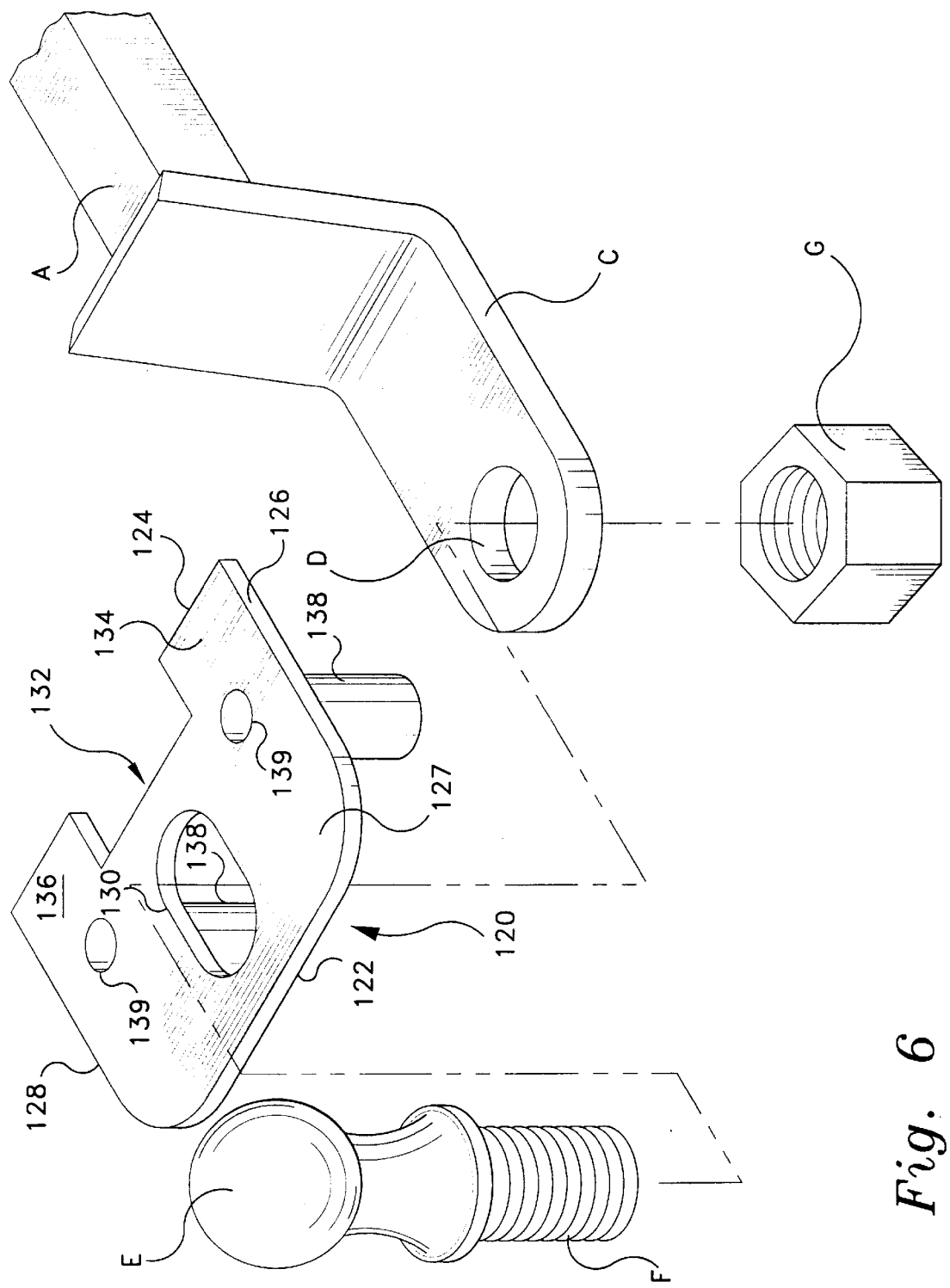
FIG. 6 shows an exploded, environmental perspective view of the base plate of a second embodiment of the trailer hitch guide according to the present invention.

A second embodiment of the trailer hitch guide is shown in FIGS. 6 through 8. As in the first embodiment. the trailer hitch guide includes a base plate 120 and a fence 140. In the second embodiment, the base plate 120 is a flat, substantially rectangular plate. The plate 120 has a front edge 122, a rear edge 124, and two opposing side edges 126, 128, a top surface 127 and a bottom surface 129. The plate has a hole or slot 130 defined therein having a width from side to side slightly greater than the diameter of the stud F of the ball hitch E but smaller than the diameter of the base of the ball hitch E so that the stud F may pass through the slot 130 but the ball is prevented from doing so. The slot 130 is elongated from front to back so that the position of the base plate 120 may be moved forward or backward on the angle C, if necessary.

The base plate 120 has a rectangular notch 132 defined in the rear edge 124. The length and the width of the notch 132 are adapted for receiving the vertical leg of the angle C so that the base plate 120 cannot rotate about the stud F when the base plate 120 is secured to the angle C by the ball hitch E. The notch 132 is defined by a left leg 134 and a right leg 136 of the base plate 120. The right leg 136 prevents rotation of the base plate 120 in a clockwise direction, and the left leg 134 prevents rotation in a counterclockwise direction.

The base plate 120 has a pair of hollow, cylindrical tubes 138 depending from its bottom surface 129 on opposite sides of the plate 120 forward of the notch 132. The tubes 138 are concentric with a pair of holes 139 defined in the base plate 120 and are sized and dimensioned for receiving the studs depending from the fence 140. The tubes 138 may be attached to the base plate 120 by welding. Alternatively, the holes 139 may be threaded, or have threaded nipples depending from the base plate 120 to which the tubes 138 may be removably attached. In another alternative the tubes 138 may have an annular flange about their top rim so that the tubes 138 may be inserted through the holes 139 from the top surface 127 and retained by welding or by a compression fit.

Exemplary dimensions of the base plate 120 may be about three inches long from front edge 122 to rear edge 124 and a width of about 5¼" from side 126 to side 128. The slot 130 may be about 1½" long from front to rear and about 1⅛" from side to side. The notch 132 may be between about 2½" to three inches wide and about one inch deep. The holes 139 and inside diameter of the tubes 138 may be about ½".

The second embodiment of the trailer hitch guide also includes a V-shaped fence 140 formed from two plates 142 joined, as by welding, at a line in order to form a dihedral angle, each plate 142 having a stud 144 or pin depending from its bottom edge and fixedly attached thereto, as by welding. The construction and use of the V-shaped fence 140 of the second embodiment is identical to the construction and use of the V-shaped fence 40 of the first embodiment, and will not be described further.

Use of the second embodiment of the trailer hitch guide is similar to the manner of using the first embodiment. The base plate 120 is placed on the horizontal leg of the angle C and moved forward and backward in order to align the left leg 134 and the right leg on opposite sides of the vertical leg of the angle C and the elongated hole or slot 130 with the hole D defined in the angle C. The stud F of the ball hitch E is inserted through the aligned holes 130, D, and the base plate 120 is clamped to the angle C by tightening the nut G. The V-shaped fence 140 may then be removably attached to the base plate 120 by inserting the studs 144 into the elongated tubes 138, the vertex of the fence 140 resting on the angle C. In some cases, the fence 140 may have a notch 146 at the bottom of the vertex formed by removing a triangular portion from the bottom of each plate 142 in order to accommodate the fence 140 to the angle C, as the vertical leg of the angle C may have different widths, the horizontal leg of the angle may have different lengths, and the forward slope of the vertical leg of the angle C may be nonstandard.

It is to be understood that the present invention is not limited to the sole embodiments described above, but encompasses any and all embodiments within the scope of the following claims. It will be understood with respect to the first embodiment shown in FIGS. 1–5, for example, that although the rectangular collar defined by the base plate 20 and the U-shaped member 24 has been described as adapted for sliding over the leg of an angle C at the end of the box beam A of a tow hitch, the collar may be sized and dimensioned to slide over the box beam A itself and still be within the scope of the present invention.

I claim:

1. A trailer hitch guide for guiding a socket mounted on a trailer tongue into alignment with a ball hitch attached to a tow bar on a towing vehicle, the guide comprising:

a) a base plate having a hole defined therein, the hole being adapted for receiving a stud depending from a ball hitch, the base plate being adapted for attachment to a towing vehicle by clamping the base plate between the ball hitch and a towing bar;

b) a pair of elongated, hollow cylindrical tubes fixedly attached to said base plate; and c) a V-shaped fence, the fence being formed by two plates joined at a line to define a dihedral angle, each plate having a stud depending from a bottom edge of the plate, the fence being slidably and removably mounted on said base plate by inserting the studs into said cylindrical tubes, the vertex of the V-shaped fence pointing towards a front of the towing vehicle and a ball hitch being disposed between the plates adjacent the vertex of the dihedral angle formed by said plates when the V-shaped fence is mounted on said base plate; and wherein said base plate further comprises a U-shaped member fixedly attached to a pair of opposing sides of said base plate, the U-shaped member having a crossbar connecting a pair of side plates at opposite ends of the crossbar, said base plate and the U-shaped member defining a rectangular collar, said base plate being adapted for attachment to the towing vehicle by sliding said collar onto the tow bar and fastening said base plate to the tow bar; and wherein said cylindrical tubes are fixedly attached to the side plates of said U-shaped member, said cylindrical tubes having a top rim substantially coplanar with a top surface of said base plate so that a socket of a trailer tongue may rotate freely about a ball hitch when said fence is removed from said base plate.

2. The trailer hitch guide according to claim 1, wherein said base plate further comprises a substantially flat, rectangular plate having a front edge, a rear edge, two opposing side edges, a top surface and a bottom surface, the rear edge having a rectangular notch defined therein by a left leg and a right leg on opposite side of the notch, the notch being adapted for receiving a tow bar of a towing vehicle, the left leg and the right leg preventing rotation of said base plate about the tow bar.

3. The trailer hitch guide according to claim 2, wherein said elongated cylindrical tubes depend from the bottom surface of said base plate, said cylindrical tubes being concentric with a pair of holes defined through said base plate.

4. The trailer hitch guide according to claim 2, wherein the hole defined in said base plate is elongated in a direction extending from the front to the back of said base plate so that the position of said base plate on the tow bar may be adjusted forward and backward.

\* \* \* \* \*